(12) United States Patent
Berg

(10) Patent No.: US 7,954,881 B2
(45) Date of Patent: Jun. 7, 2011

(54) APPARATUS FOR A PICKUP TRUCK BOX COVER

(76) Inventor: Frederic P. Berg, Seattle, WA (US)

( * ) Notice: Subject to any disclaimer, the term of this patent is extended or adjusted under 35 U.S.C. 154(b) by 263 days.

(21) Appl. No.: 12/434,618

(22) Filed: May 2, 2009

(65) Prior Publication Data

US 2010/0276967 A1 Nov. 4, 2010

(51) Int. Cl.
*B62D 35/00* (2006.01)
*B60P 7/02* (2006.01)

(52) U.S. Cl. .................. 296/180.1; 296/26.08; 296/10; 296/100.02

(58) Field of Classification Search .................. 296/10, 296/26.01, 26.08, 100.02, 100.16, 100.17, 296/180.1, 180.2, 99.1; D12/96, 98, 99, D12/414.1, 401

See application file for complete search history.

(56) References Cited

U.S. PATENT DOCUMENTS

| 4,496,184 | A | * | 1/1985 | Byrd et al. | 296/100.15 |
| D424,012 | S | * | 5/2000 | Gaytan | D12/404 |
| D432,980 | S | * | 10/2000 | Gaytan | D12/404 |
| D445,397 | S | * | 7/2001 | Gaytan | D12/404 |

* cited by examiner

*Primary Examiner* — Dennis H Pedder

(57) ABSTRACT

An apparatus for a pickup truck box cover includes a frame having a generally flat rectangular shape and configured to reside in a plane generally perpendicular to a bed of the pickup truck and proximate a back of a cab of the pickup truck. A means joins the frame to a frame of the pickup truck. A means joins the frame to the pickup truck box. A top surface is removably joined to the frame and configured to extend back from a top portion of the cab of the pickup truck along a sloping plane intersecting a plane containing the bed of the pickup truck. Side panels are removably joined to the frame and configured to extend from the top surface to the bed of the pickup truck where, in conjunction with the pickup truck, a shape resembling generally flat bottom airfoil is formed.

19 Claims, 9 Drawing Sheets

APPARATUS FOR A PICKUP TRUCK BOX COVER

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to vehicles. More particularly, the invention relates to a device to improve the aerodynamic flow of pickup trucks.

BACKGROUND OF THE INVENTION

The present invention relates to devices that improve a pickup truck's aerodynamic flow that are placed into a pickup truck box, which is the cargo area of a pickup truck. The benefit of improving the pickup truck's aerodynamic flow is a reduction in aerodynamic drag and an increase in the pickup truck's fuel efficiency. More particularly, the present invention relates to producing an airfoil shape to improve the aerodynamic flow. An airfoil is known by those practicing in the field of aerodynamics as the preferred shape for producing the lowest aerodynamic drag. The airfoil design is especially effective at maintaining higher pressure in the trailing area of a moving object. Although a number of devices for improving a pickup truck's aerodynamic flow have been proposed in the prior art, none are as effective as the present invention.

Various prior art devices have been provided to fully cover or partially cover a pickup truck box in order to improve aerodynamic flow. One common device is a tonneau cover. A tonneau cover may be constructed from wood, metal, cloth, or composite; it extends from the rear of the truck cab to the truck tailgate and from both sides of the pickup truck box, covering the top of the sides of the pickup truck box and the top of the tailgate. Although tests have shown that the tonneau cover improves aerodynamic flow, and thus increases the pickup truck's fuel efficiency, the tonneau cover is not as effective as the present invention. Specifically, the tonneau cover does not improve the aerodynamic flow in the trailing area of the cab and tailgate, where a low-pressure area exists. In general, low-pressure in the trailing area of a moving object creates a drag force opposing the forward motion.

Other prior art solutions to improve aerodynamic flow are devices to be placed into the pickup truck box in front of the tailgate. Many of these devices are known as wind deflectors or enhanced aerodynamic devices. These devices claim to improve aerodynamic flow over the tailgate by modifying the leading area from a flat vertical surface to an inclined surface or curved surface. However, these devices also fall short of improving aerodynamic flow, because they do not improve the trailing area aerodynamic flow behind the cab and the tailgate.

Other prior art solutions have been suggested. For example, one prior art solution suggests a cover attached to each of the sidewalls inside the truck box to eliminate the wheel well protruding into the air flow. And another prior art solution suggests attaching rear spoilers on top of the tailgate, which are curved vanes believed to smooth the aerodynamic flow over the top of the tailgate. However, these solutions do not improve the aerodynamic flow in the trailing areas of the cab and the tailgate.

A known technique believed to improve aerodynamic flow in a pickup truck is the removal of the tailgate. Although this removes the tailgate from the flow path, and therefore eliminates lower pressure behind the tailgate as well as removes an airflow obstruction, airflow behind the cab is actually made worse when this technique is implemented. The trailing area of the cab is now larger, which creates an even lower pressure, and thus, increased aerodynamic drag. Furthermore, removing the tailgate is not always desired, for example if the pickup truck box is not completely empty.

In view of the foregoing, there is a need for improved techniques for improving the aerodynamic flow of a pickup truck by mitigating or eliminating low pressures behind the cab and behind the tailgate.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6A shows the tailgate in an upright position, and FIG. 6B shows the tailgate in an angled position;

Figure 1:
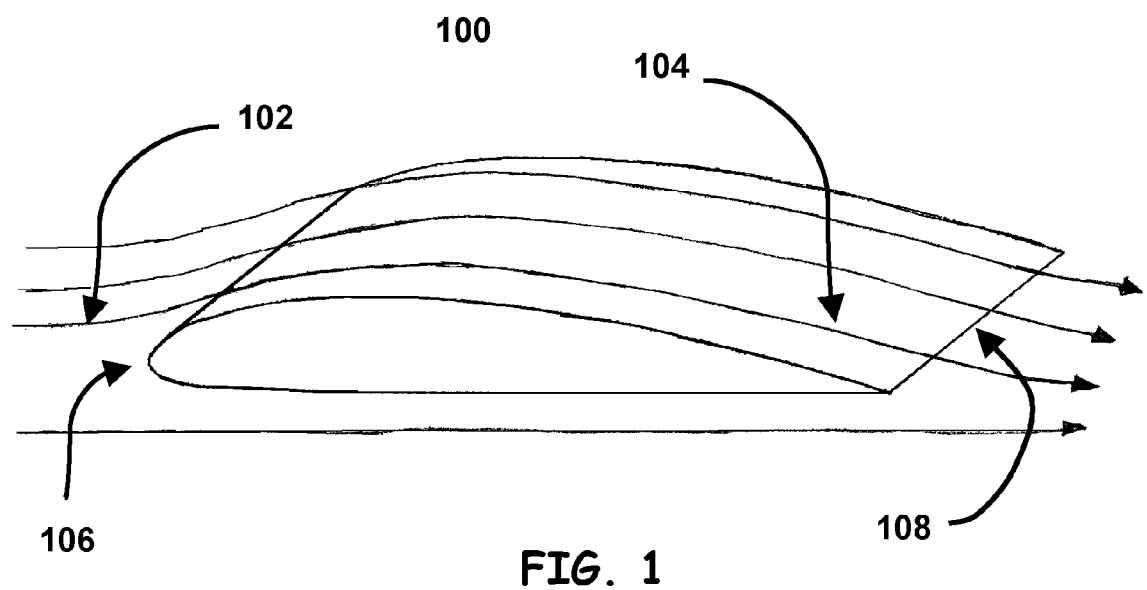
FIG. 1 is a perspective view of an exemplary flat bottom airfoil with streamlines, in accordance with the prior art.

Unless otherwise indicated illustrations in the figures are not necessarily drawn to scale.

SUMMARY OF THE INVENTION

To achieve the forgoing and other objects and in accordance with the purpose of the invention, an apparatus for a pickup truck box cover is presented.

In one embodiment, an apparatus for a pickup truck box cover is presented. The apparatus includes a top surface configured to extend back from a top portion of a cab of the pickup truck along a sloping plane intersecting a plane containing a bed of the pickup truck. Side panels are configured to extend from the top surface to the bed of the pickup truck where, in conjunction with the pickup truck, a shape resembling a generally flat bottom airfoil is formed. Another embodiment further includes a frame configured for joining the top surface and the side panels to the pickup truck. Yet another embodiment further includes means for joining the frame to a frame of the pickup truck. Still another embodiment further includes means for joining the frame to the pickup truck box. Another embodiment further includes a window configured for allowing a rear view for a driver. Yet another embodiment further includes at least one access door for allowing access to an interior space. In another embodiment the top surface meets an end of the bed of the pickup truck. In yet another embodiment the top surface meets a top end of a tailgate of the pickup truck where the tailgate is configured to incline inward over the bed along the sloping plane. In still another embodiment the top surface meets a top portion of a tailgate of the pickup truck where the tailgate is configured in an open position parallel to the bed.

In another embodiment an apparatus for a pickup truck box cover is presented. The apparatus includes means for covering a top surface extending back from a top portion of a cab of the pickup truck along a sloping plane intersecting a plane containing a bed of the pickup truck. The apparatus also includes means for covering sides extending from the top surface covering means to the bed of the pickup truck where, in conjunction with the pickup truck, a shape resembling a generally flat bottom airfoil is formed. Another embodiment further includes frame means for joining the top surface covering means and the sides covering means to the pickup truck. Yet another embodiment further includes means for joining the frame means to the pickup truck. Still another embodiment further includes means for allowing a rear view for a driver. Another embodiment further includes means for accessing an interior space.

In another embodiment an apparatus for a pickup truck box cover is presented. The apparatus includes a frame having a generally flat rectangular shape and configured to reside in a plane generally perpendicular to a bed of the pickup truck and proximate a back of a cab of the pickup truck. Means for joining joins the frame to a frame of the pickup truck. Means for joining joins the frame to the pickup truck box. A top surface is removably joined to the frame and configured to extend back from a top portion of the cab of the pickup truck along a sloping plane intersecting a plane containing the bed of the pickup truck. Side panels are removably joined to the frame and configured to extend from the top surface to the bed of the pickup truck where, in conjunction with the pickup truck, a shape resembling generally flat bottom airfoil is formed. In another embodiment the top surface further includes a window configured in the top surface for allowing a rear view for a driver. Another embodiment further includes at least one access door for allowing access to an interior space. In another embodiment the top surface meets an end of the bed of pickup truck. In yet another embodiment the top surface meets a top end of a tailgate of the pickup truck where the tailgate is configured to incline inward over the bed along the sloping plane. In still another embodiment the top surface meets a top portion of a tailgate of the pickup truck where the tailgate is configured in an open position parallel to the bed.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

Preferred embodiments of the present invention have the utility of reducing fuel consumption for pickup trucks. This utility not only reduces fuel consumption for the benefit of the owner, but also benefits the public in reducing the greenhouse gas carbon dioxide ($CO_2$) and reduces the public's total fuel consumption, which in turn reduces the public's fuel demand and thereby reduces the cost of fuel. Another useful purpose of preferred embodiments is that they provide a conveniently accessed, covered, and secure storage area in the boxes of pickup trucks.

Attaching a device according to preferred embodiments of the present invention to a pickup truck creates a more aerodynamic combined shape, where the shape produces less drag when moving through air. This phenomenon is more pronounced as the air speed increases. An object that generates less drag when moving through air uses less energy to propel it than an object that generates more drag. One such aerodynamic object is a flat bottom airfoil. Preferred embodiments attached to pickup trucks form a combined shape that resembles a flat bottom airfoil. As will be described herein, preferred embodiments are mainly comprised of an airfoil cover frame, for example, without limitation, airfoil cover frame 400 shown by way of example in FIG. 4, and an airfoil cover, for example, without limitation, airfoil cover 500 shown by way of example in FIG. 5. Preferred embodiments generally eliminate low pressures in the trailing areas behind the cab and behind the tailgate.

FIG. 1 is a perspective view of an exemplary flat bottom airfoil 100 with streamlines 102 and 104, in accordance with the prior art. Streamlines are used by those skilled in the art of aerodynamic flow to represent air flowing on and around an object. The arrow at the end of a streamline indicates the direction of the moving air relative to the object. Airfoil 100, similarly to other typical airfoils, has a wide rounded area at the front of its shape, where the very front edge is a leading edge 106. After the front area, airfoil 100 tapers and converges to a thin edge, or a trailing edge 108. Streamlines that are parallel represent smooth airflow. At leading edge 106 of airfoil 100, streamlines 102 are slightly bent. Streamlines 102 must bunch up since the airflow contacts an obstruction, which is leading edge 106 of airfoil 100. This is an area of higher pressure; higher air pressure in front of a moving object creates drag, which opposes motion. At trailing edge 108 of airfoil 100, streamlines 104 are also slightly bent where they must recombine with other streamlines moving past airfoil 100. At the rear of airfoil 100 is an area of slightly lower pressure, which creates drag and opposes motion.

Figure 2:
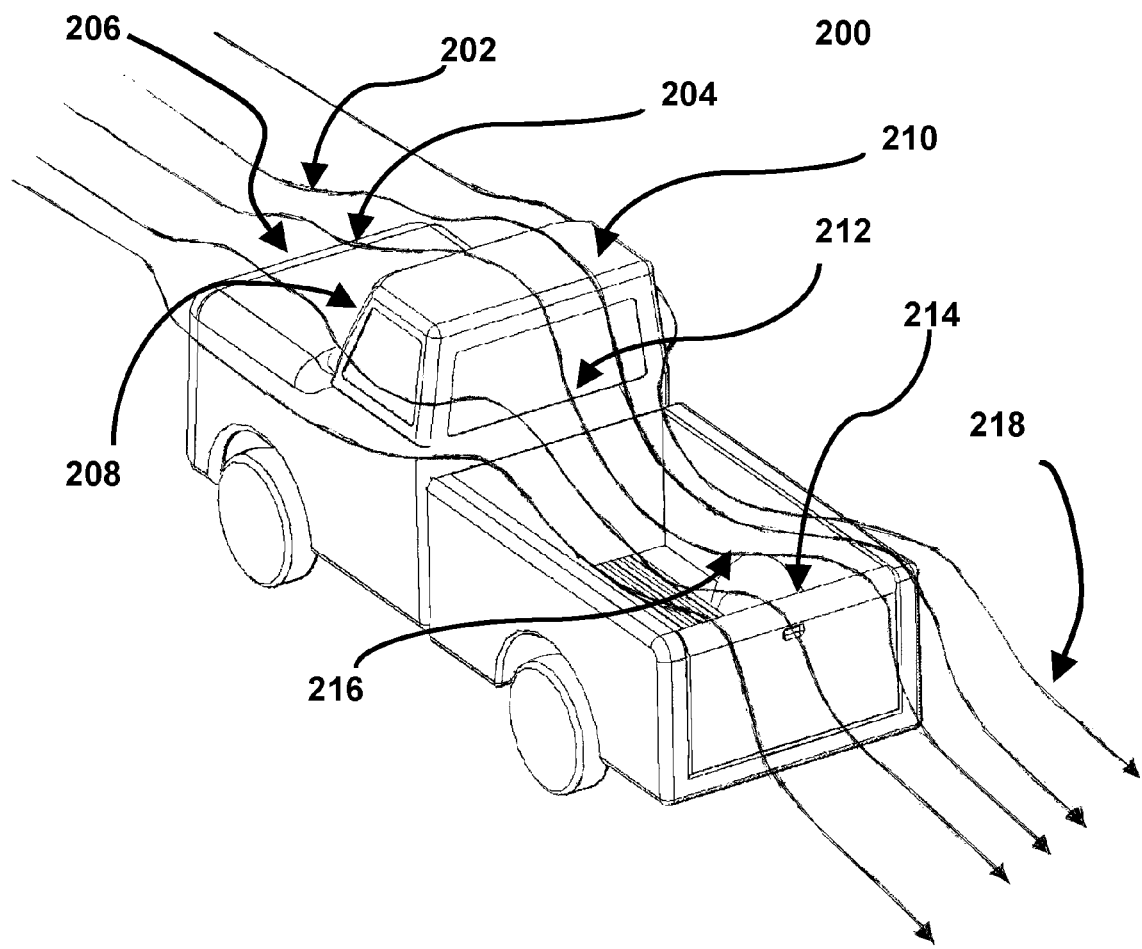
FIG. 2 is a perspective view of an exemplary moving pickup truck with a closed tailgate and streamlines to illustrate the movement of air around the pickup truck, in accordance with the prior art.

FIG. 2 is a perspective view of an exemplary moving pickup truck 200 with a closed tailgate 214 and streamlines to illustrate the movement of air around pickup truck 200, in accordance with the prior art. In the front area of pickup truck 200, streamlines 202 and 204 must bend around a front edge 206 comprising the grill and headlights and a windshield 208, respectively. In this frontal area of pickup truck 200, the air pressure is relatively high. As a consequence, this high-pressure area creates drag on moving pickup truck 200, which opposes the motion of pickup truck 200. At the rear of a cab 210, streamlines 212 must bend around to fill in the void created as the rear of cab 210 moves forward. The area behind cab 210 is an area of relatively low pressure, which creates drag. As the air flows into the low-pressure area behind cab 210, the air next encounters the front of tailgate 214. Streamlines 216 must again bend to go around the front of tailgate 214. This is another area of relatively high air pressure and creates additional drag. The airflow continues past the rear of pickup truck 200, as streamlines 218 represent, and must fill in the void at the rear of tailgate 214, which is another area of relatively low pressure that creates additional drag. Therefore, moving pickup truck 200 has several areas at its front and rear that create aerodynamic drag, which contributes to less efficient use of fuel.

Figure 3:
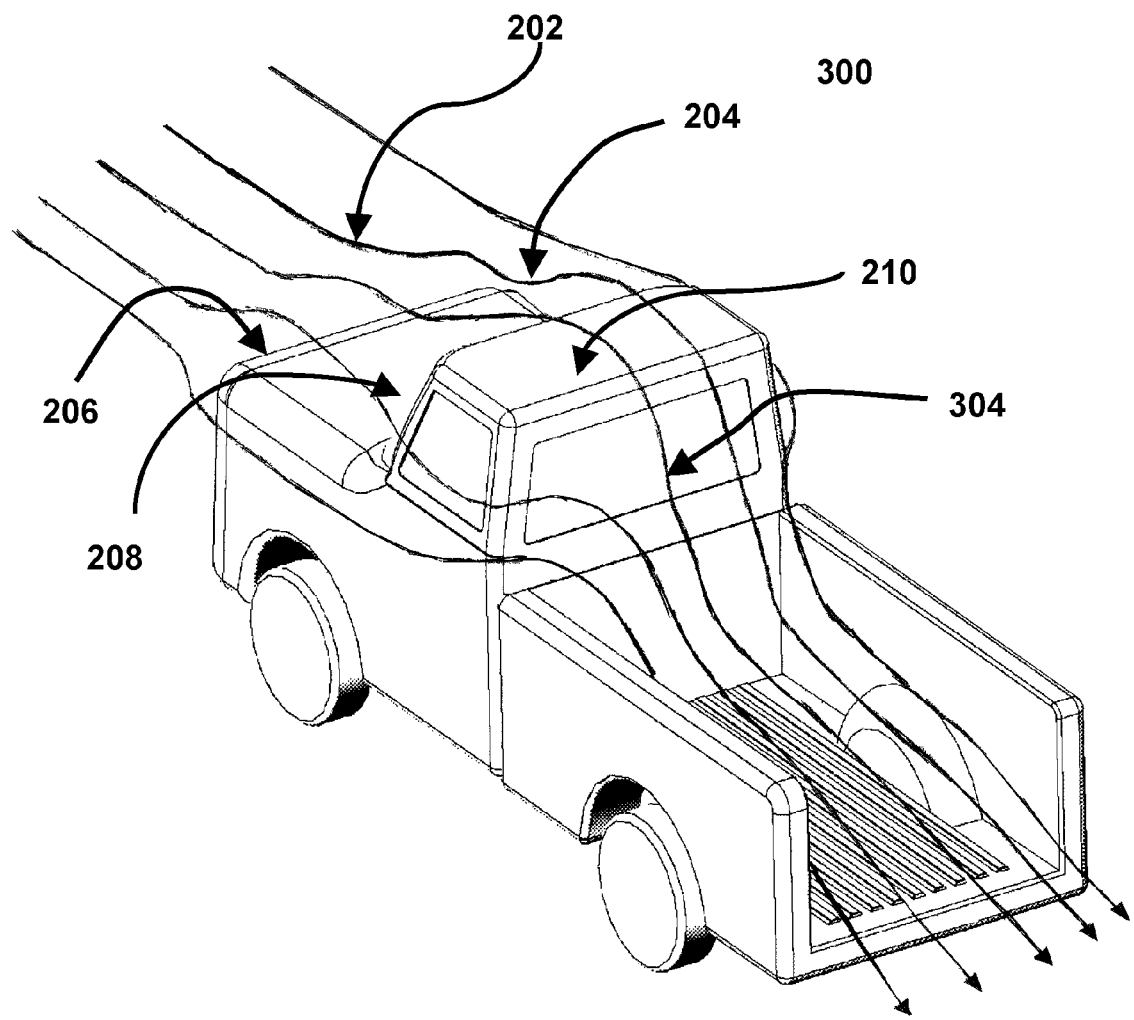
FIG. 3 is a perspective view of an exemplary moving pickup truck with an open cargo box without a tailgate and streamlines to illustrate the movement of air around the pickup truck, in accordance with the prior art.

FIG. 3 is a perspective view of an exemplary moving pickup truck 300 with an open cargo box without a tailgate and streamlines to illustrate the movement of air around pickup truck 300, in accordance with the prior art. Removing the tailgate from a pickup truck is believed by some as a technique to reduce aerodynamic drag on a moving pickup truck. As described previously, streamlines 202 and 204 bend around a front area 206 comprising the grille and headlights and a windshield 208 respectively. In this frontal area of pickup truck 300, the air pressure is relatively high and creates drag on moving pickup truck 300. However, at the rear of a cab 210, streamlines 304 must bend around to fill in a much larger void created as the rear of cab 210 moves forward than is created when a tailgate is closed. The air pressure at the rear of cab 210 is lower than if a tailgate was present. As a result, higher drag is produced on pickup truck 300 without a tailgate than on a pickup truck with a tailgate. With a tailgate, the high pressure generated in the front area is combined with the lower pressure behind the cab to produce a moderate pressure difference.

Figure 4:
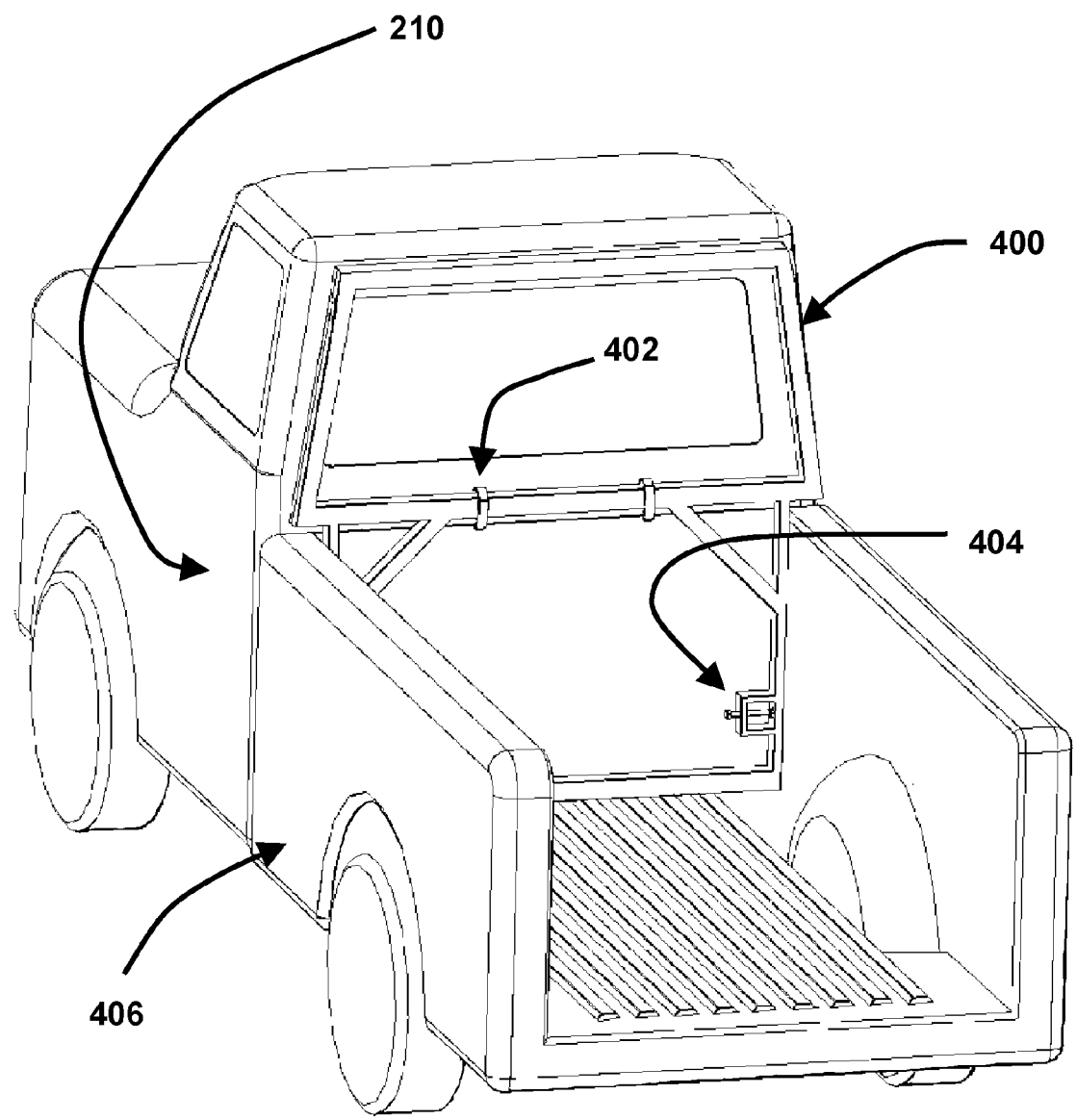
FIG. 4 is a perspective view of an exemplary pickup truck comprising an exemplary airfoil-cover frame, in accordance with an embodiment of the present invention.

FIG. 4 is a perspective view of an exemplary pickup truck comprising an exemplary airfoil-cover frame 400, in accordance with an embodiment of the present invention. In the present embodiment, airfoil-cover frame 400 is securely attached to the pickup truck frame. Belts 402 pass between the front of a pickup box 406 and the rear of a cab 210 to securely attach airfoil-cover frame 400 to the pickup truck's frame (not shown). The pickup truck's frame anchors the engine, cab 210, and pickup box 406, so the pickup truck's frame is the preferred anchor location. However, in alternate embodiments, the airfoil-cover frame 400 may be attached to the pickup truck in different locations; for example, without limitation, the frame may be attached to the cab and pickup box, only to the cab or only to the box. In the present embodiment, at least two belts 402 are used for redundancy. Two other attachment locations 404 (only one side is shown) are used to attach airfoil-cover frame 400 to the inside of pickup truck box 406. This configuration uses a bolt with two locking nuts. However, alternate embodiments may use various different attachment means such as, but not limited to, a single locking toggle-clamping mechanism, whereby pushing the clamp handle expands, or spreads out, the lower portion of airfoil-cover frame 400, at 404, into the side walls of the pickup truck box 406, or a dual locking toggle-clamping mechanism, where a locking toggle-clamp is located at each location 404, etc. In the present embodiment, airfoil-cover frame 400 typically remains attached to the pickup truck and is not removed as often as the airfoil-cover, which is attached to airfoil-cover frame 400. When desired, the airfoil-cover, which is light in weight, can be easily removed so that the pickup truck can revert to its original configuration, an open box with a tailgate. Airfoil-cover frame 400, which typically remains attached to pickup truck box 406, can be used to attach cables, straps, or ropes and secure cargo items; this is especially useful since a pickup truck does not normally have attachment points.

Figure 5:
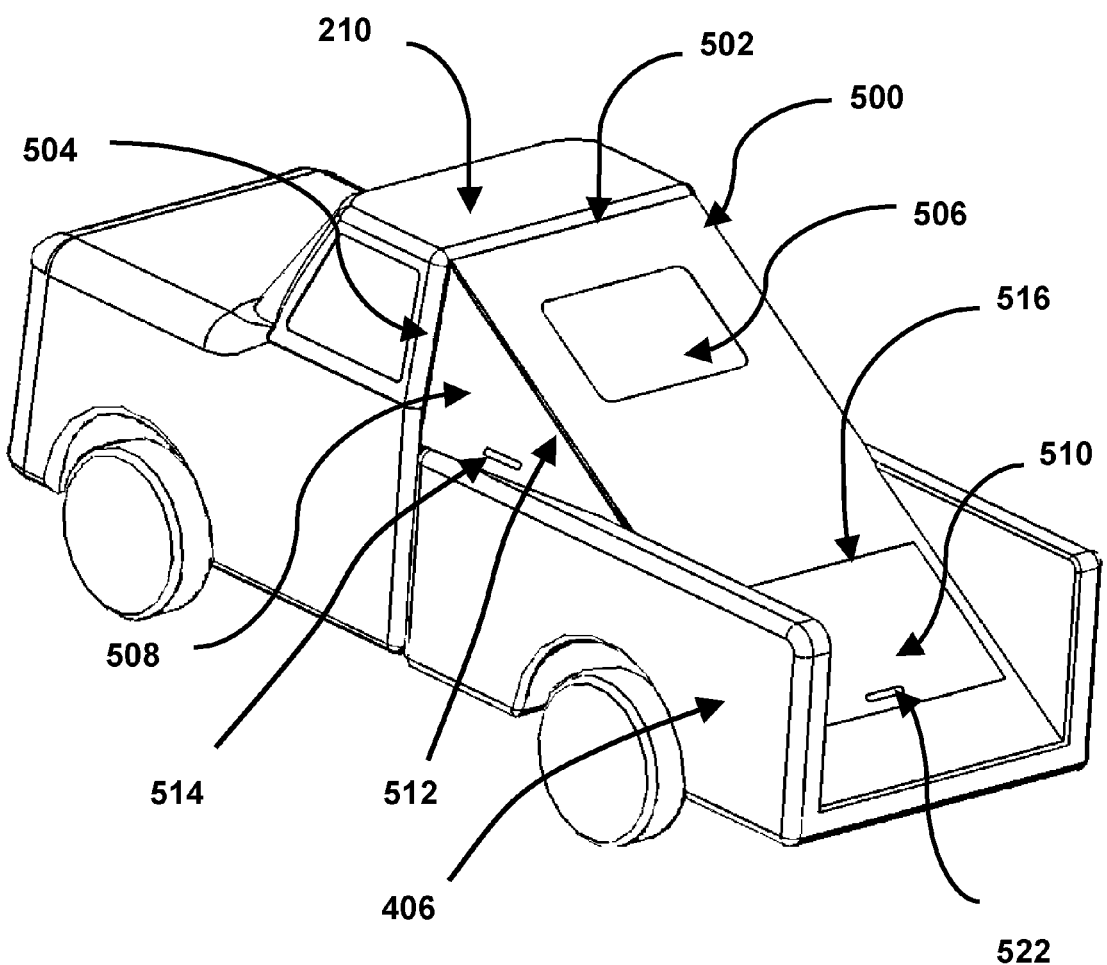
FIG. 5 is a perspective view of an exemplary pickup truck with an exemplary airfoil-cover, in accordance with an embodiment of the present invention.

FIG. 5 is a perspective view of an exemplary pickup truck with an exemplary airfoil-cover 500, in accordance with an embodiment of the present invention. In the present embodiment, airfoil-cover 500 is attached to an airfoil-cover frame, such as, but not limited to, airfoil-cover frame 400 shown by way of example in FIG. 4. Airfoil-cover 500 may be attached to the airfoil-cover frame using various different means such as, but not limited to, bolts, clamps, straps, pins, etc. When attached to a box 406 of the pickup truck, airfoil-cover 500 creates a shape resembling the rear portion of a flat bottom airfoil. Airfoil-cover 500 is light in weight so that it can be easily removed and reinstalled; it may be constructed from various lightweight materials such as, but not limited to, thin wood, cloth, aluminum, or composite materials. For preferred operation of the present embodiment, the pickup truck tailgate must be removed. Airfoil-cover 500 must be tightly fitted to a cab 210 of the pickup truck, and edges 502 and 504 of airfoil-cover 500 must not extend above the surface of cab 210, nor past the sides of cab 210, though edges 502 and 504 may be slightly below the surface of cab 210 at its side and top surfaces. In this configuration, edges 502 and 504 are not in the flow path where they would increase aerodynamic drag.

In the present embodiment, airfoil-cover 500 comprises a window 506, two side doors 508 (only the driver's side door is shown), and an access door 510. Window 506 enables a driver's rear view to be unobstructed. In the present embodiment, side doors 508 and access door 510 are secure and enable a user to access the space under airfoil-cover 500, thus creating an accessible, convenient, and secure storage area into which to load cargo into pickup truck box 406. Alternate embodiments may include various other features such as, but not limited to, a windshield wiper for window 506, a brake light viewing cutout located at the top of the airfoil-cover that would enable the brake light on the top rear of the cab to be seen by other drivers, more or fewer doors, doors with different orientations, and windows, locks, etc. Other alternate embodiments may not comprise any doors or windows. In the present embodiment, side doors 508 are attached with hinges 512 and opened with handles 514. In the present embodiment, doors 508 may be easily detached by removing a hinge pin (not shown) of hinges 512. This makes installation of airfoil-cover 500 easier, since side doors 508 do not add weight or flop around during installation. After installing airfoil-cover 500, side doors 508 can then be attached separately. Access door 510 is attached by hinges 516 and opened using a handle 522. In some embodiments, the access door may also be removable. In the present embodiment, all handles are recessed so as not to protrude into the flow path; however, alternate embodiments may have non-recessed handles.

Figure 6A:
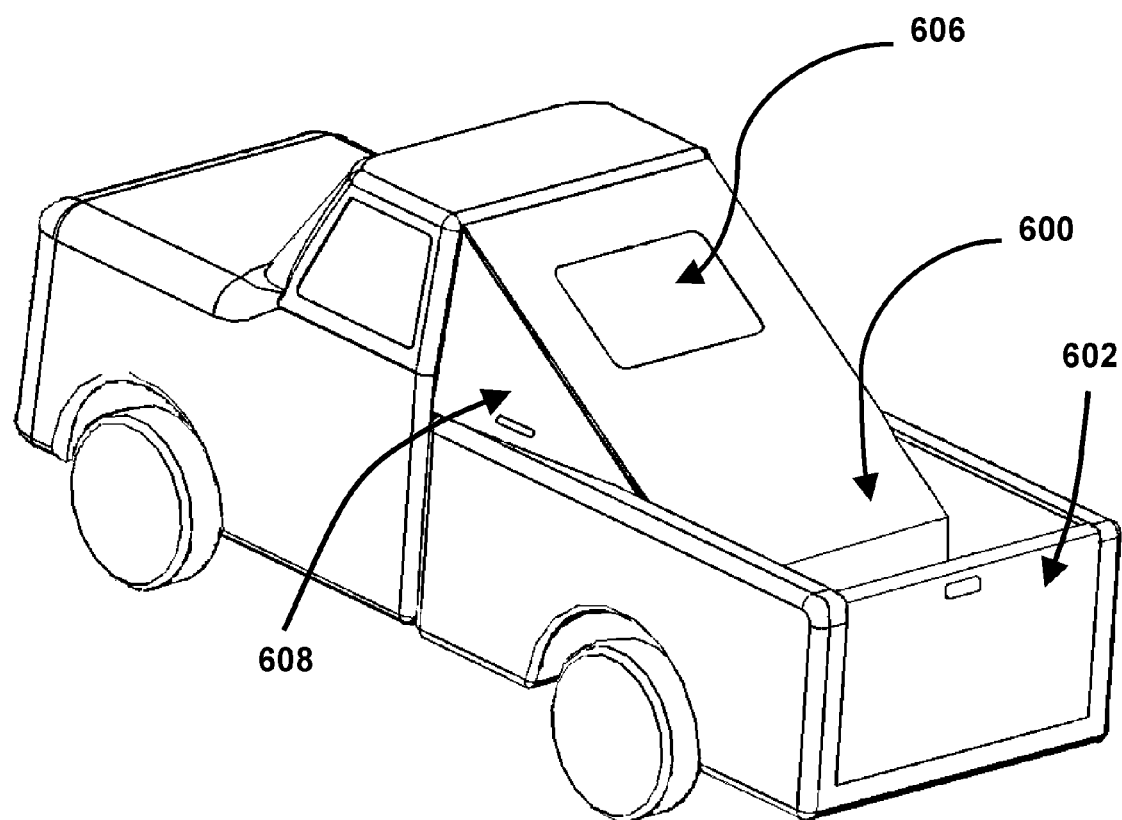
FIGS. 6A and 6B illustrate an exemplary airfoil-cover that may be used with a tailgate, in accordance with an embodiment of the present invention.
Figure 6B:
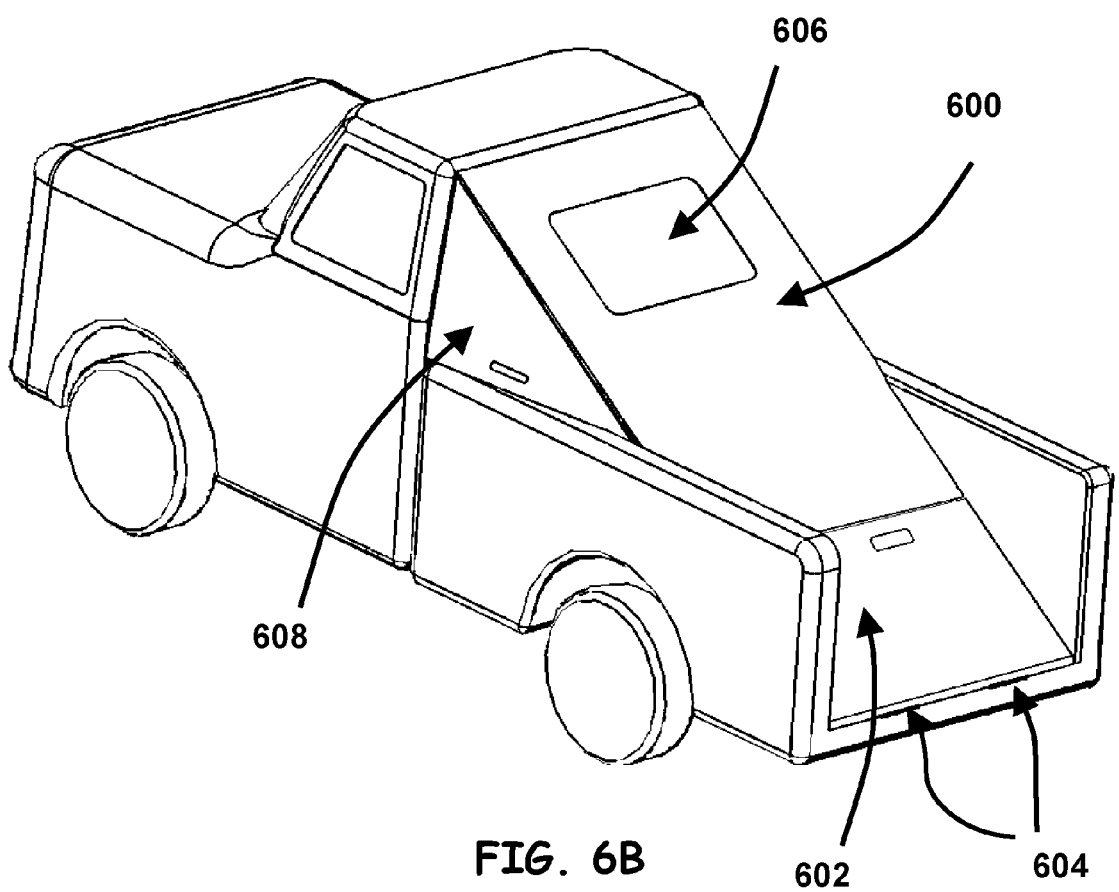

FIGS. 6A and 6B illustrate an exemplary airfoil-cover 600 that may be used with a tailgate 602, in accordance with an embodiment of the present invention. FIG. 6A shows tailgate 602 in an upright position, and FIG. 6B shows tailgate 602 in an angled position. In the present embodiment, tailgate 602 is incorporated into airfoil-cover 600 so that tailgate 602 does not need to be removed. Tailgate 602 comprises hinges 604 that enable tailgate 602 to rotate more than ninety degrees so that tailgate 602 may rotate past vertical to match up with airfoil-cover 600. Referring to FIG. 6B, tailgate 602 rotates around hinges 604 into the pickup box to complete the airfoil shape. In the present embodiment, a stop such as, but not limited to a bolt, extruded metal, or machined metal, is attached to the inside of the pickup truck box or to airfoil-cover 600 to stop the rotation of tailgate 602 so that tailgate 602 aligns with airfoil-cover 600. Some embodiments may comprise a latch to hold the tailgate and the airfoil-cover together when in the angled position. In the present embodiment, airfoil-cover 600 comprises a window 606 and two side doors 608 similar to window 506 and side doors 508 shown, by way of example, in FIG. 5; however, alternate embodiments, may comprise more or fewer doors, or doors in different orientations, and windows in various different configurations. In the present embodiment, the portion of airfoil-cover 600 that extends downward from where tailgate 602 makes contact is completely open; however, alternate embodiments may comprise access doors in this area.

Figure 7:
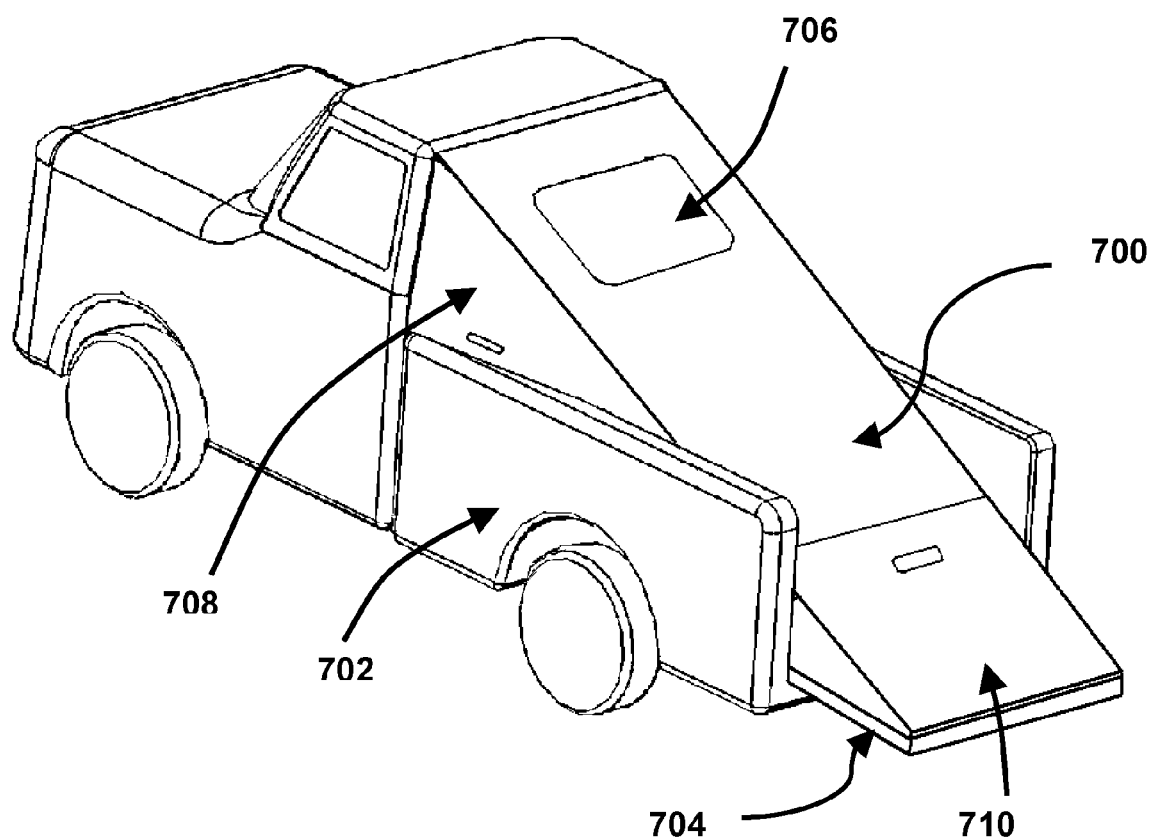
FIG. 7 is a perspective view of an exemplary airfoil-cover that extends past a cargo box of a pickup truck, in accordance with an embodiment of the present invention.

FIG. 7 is a perspective view of an exemplary airfoil-cover 700 that extends past a cargo box 702 of a pickup truck, in accordance with an embodiment of the present invention. In the present embodiment, a tailgate 704 has been opened to allow airfoil-cover 700 to rest on top. In alternate embodiments, the tailgate may be removed to enable the airfoil-cover to extend beyond the cargo box of the pickup truck. In the present embodiment, airfoil-cover 700 comprises a window 706 and two side doors 708 similar to window 506 and side doors 508 shown, by way of example, in FIG. 5; however, alternate embodiments, may comprise more or fewer doors and windows in various different configurations. In the present embodiment, an access door 710 is hinged at the bottom and swings upward and away from airfoil-cover 700 to rest parallel to the ground when completely open, similarly to tailgate 602 shown, by way of example, in FIGS. 6A and 6B. However, in alternate embodiments, the access door may be hinged at the top to swing upward similarly to access door 510 shown, by way of example, in FIG. 5.

Figure 8:
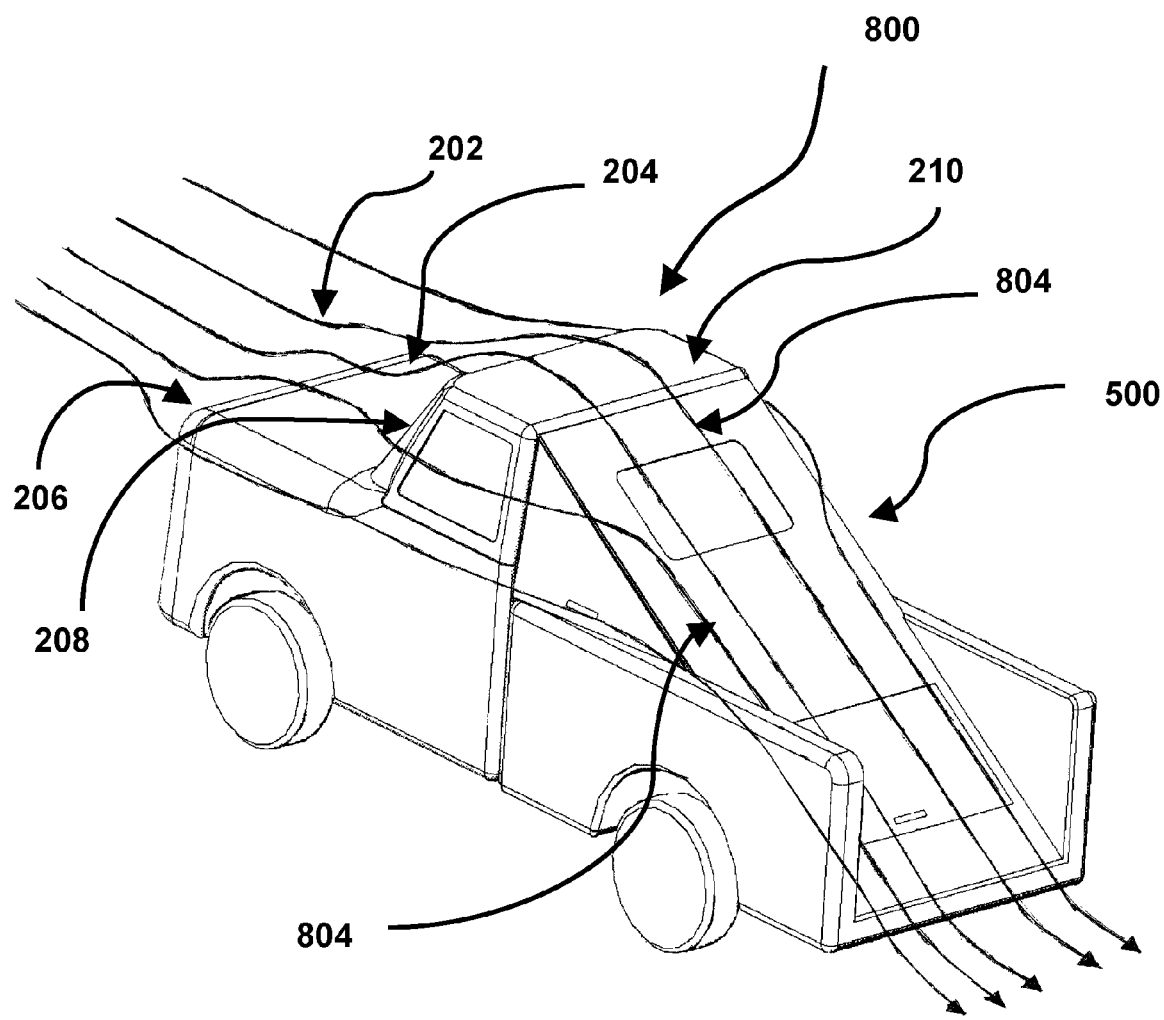
FIG. 8 is a perspective view of an exemplary moving pickup with an exemplary airfoil-cover attached to an airfoil-cover frame (not shown) as well as streamlines generated to illustrate the movement of air around the pickup truck, in accordance with an embodiment of the present invention.

FIG. 8 is a perspective view of an exemplary moving pickup 800 with an exemplary airfoil-cover 500 attached to an airfoil-cover frame (not shown) as well as streamlines generated to illustrate the movement of air around pickup truck 800, in accordance with an embodiment of the present invention. As with the configurations illustrated, by way of example, in FIGS. 2 and 3, streamlines 202 and 204 in the front area of pickup truck 800 bend around a front edge 206 comprising the grill and headlights and a windshield 208, respectively. In this front area, the air pressure is relatively high and thus creates drag on moving pickup truck 800. However, at the rear of a cab 210, airfoil-cover 500 fills this space so that streamlines 804 follow the surface of airfoil-cover 500 to the rear of pickup truck 800 rather than creating areas of low pressure as in the configurations shown, by way of example, in FIGS. 2 and 3. Streamlines 804 in the present embodiment are smooth and there is little to no decrease in air pressure. The present embodiment increases the air pressure behind cab 210 and generally eliminates the drag force generated at the rear of pickup truck 800 and improves the overall mileage efficiency of pickup truck 800 and thus, reduces fuel consumption.

Having fully described at least one embodiment of the present invention, other equivalent or alternative methods of providing a device for improving the aerodynamic flow of trucks according to the present invention will be apparent to those skilled in the art. The invention has been described above by way of illustration, and the specific embodiments disclosed are not intended to limit the invention to the particular forms disclosed. For example, the particular implementation of the airfoil-cover may vary depending upon the particular type of vehicle used. The airfoil-covers described in the foregoing were directed to pickup truck implementations; however, similar techniques are to create airfoil-covers to improve the aerodynamics of other types of vehicles such as, but not limited to, flatbed trucks, semis with or without trailers, etc. Implementations of the present invention for vehicles other than pickup trucks are contemplated as within the scope of the present invention. The invention is thus to cover all modifications, equivalents, and alternatives falling within the spirit and scope of the following claims.

What is claimed is:

1. An apparatus for a pickup truck box cover, the apparatus comprising:
    a top surface configured to extend back from a top portion of a cab of the pickup truck along a sloping plane intersecting a horizontal plane contained within a bed of the pickup truck; and
    side panels configured to extend from said top surface to the bed of the pickup truck where, in conjunction with the pickup truck, a low pressure area rearward of the cab is reduced.

2. The apparatus as recited in claim 1, further comprising a frame configured for joining said top surface and said side panels to the pickup truck.

3. The apparatus as recited in claim 2, further comprising means for joining said frame to a frame of the pickup truck.

4. The apparatus as recited in claim 1, further comprising a window configured for allowing a rear view for a driver.

5. The apparatus as recited in claim 1, further comprising at least one access door for allowing access to an interior space.

6. The apparatus as recited in claim 1, wherein said top surface meets an end of the bed of the pickup truck.

7. The apparatus as recited in claim 1, wherein said top surface meets a top end of a tailgate of the pickup truck where the tailgate is configured to incline inward over the bed along said sloping plane.

8. The apparatus as recited in claim 1, wherein said top surface meets a top portion of a tailgate of the pickup truck where the tailgate is configured in an open position parallel to the bed.

9. An apparatus for a pickup truck box cover, the apparatus comprising:
    means for covering a top surface extending back from a top portion of a cab of the pickup truck along a sloping plane intersecting a horizontal plane contained within a bed of the pickup truck; and
    means for covering sides extending from said top surface covering means to the bed of the pickup truck where, in conjunction with the pickup truck, a low pressure area rearward of the cab is reduced.

10. The apparatus as recited in claim 9, further comprising frame means for joining said top surface covering means and said sides covering means to the pickup truck.

11. The apparatus as recited in claim 10, further comprising means for joining said frame means to the pickup truck.

12. The apparatus as recited in claim 9, further comprising means for allowing a rear view for a driver.

13. The apparatus as recited in claim 9, further comprising means for accessing an interior space.

14. An apparatus for a pickup truck box cover, the apparatus comprising:
   a frame having a generally flat rectangular shape and configured to reside in a plane generally perpendicular to a bed of the pickup truck and proximate a back of a cab of the pickup truck;
   means for joining said frame to a frame of the pickup truck;
   means for joining said frame to the pickup truck box;
   a top surface removably joined to said frame and configured to extend back from a top portion of the cab of the pickup truck along a sloping plane intersecting a horizontal plane contained within the bed of the pickup truck; and
   side panels removably joined to said frame and configured to extend from said top surface to the bed of the pickup truck where, in conjunction with the pickup truck, a low pressure area rearward of the cab is reduced.

15. The apparatus as recited in claim 14, wherein said top surface further comprises a window configured in said top surface for allowing a rear view for a driver.

16. The apparatus as recited in claim 14, further comprising at least one access door for allowing access to an interior space.

17. The apparatus as recited in claim 14, wherein said top surface meets an end of the bed of pickup truck.

18. The apparatus as recited in claim 14, wherein said top surface meets a top end of a tailgate of the pickup truck where the tailgate is configured to incline inward over the bed along said sloping plane.

19. The apparatus as recited in claim 14, wherein said top surface meets a top portion of a tailgate of the pickup truck where the tailgate is configured in an open position parallel to the bed.

* * * * *